(12) United States Patent
Harvey, Jr. et al.

(10) Patent No.: US 7,596,718 B2
(45) Date of Patent: Sep. 29, 2009

(54) RANGED FAULT SIGNATURES FOR FAULT DIAGNOSIS

(75) Inventors: Jerry Lynn Harvey, Jr., Plano, TX (US); Alexander T. Schwarm, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 11/800,461

(22) Filed: May 4, 2007

(65) Prior Publication Data
US 2008/0015726 A1 Jan. 17, 2008

Related U.S. Application Data

(60) Provisional application No. 60/746,649, filed on May 7, 2006, provisional application No. 60/746,647, filed on May 7, 2006.

(51) Int. Cl.
*G06F 11/00* (2006.01)
(52) U.S. Cl. .................................................. 714/25
(58) Field of Classification Search ................ 714/25, 714/724; 702/185
See application file for complete search history.

(56) References Cited

U.S. PATENT DOCUMENTS

| 5,442,562 | A | 8/1995 | Hopkins et al. |
|---|---|---|---|
| 6,678,569 | B2 | 1/2004 | Bunkofske et al. |
| 6,868,342 | B2 | 3/2005 | Mutter et al. |
| 6,907,545 | B2 * | 6/2005 | Ramadei et al. ............ 714/25 |
| 6,954,883 | B1 * | 10/2005 | Coss et al. ................. 714/47 |
| 7,062,411 | B2 | 6/2006 | Hopkins et al. |
| 7,072,794 | B2 | 7/2006 | Wittkowski |
| 7,079,677 | B2 | 7/2006 | Tai et al. |
| 7,089,154 | B2 * | 8/2006 | Rasmussen et al. ......... 702/183 |
| 7,151,976 | B2 | 12/2006 | Lin |
| 7,413,546 | B2 | 8/2008 | Agutter et al. |
| 2002/0143472 | A1 | 10/2002 | Mutter et al. |
| 2003/0109951 | A1 | 6/2003 | Hsiung et al. |
| 2003/0225466 | A1 | 12/2003 | Yulevitch et al. |
| 2004/0002842 | A1 | 1/2004 | Woessner |
| 2004/0024543 | A1 | 2/2004 | Zhang et al. |
| 2004/0110310 | A1 | 6/2004 | Sun et al. |
| 2004/0210850 | A1 | 10/2004 | Bermudez et al. |
| 2004/0254762 | A1 | 12/2004 | Hopkins et al. |
| 2005/0010117 | A1 | 1/2005 | Agutter et al. |
| 2005/0060103 | A1 | 3/2005 | Chamness |

(Continued)

OTHER PUBLICATIONS

Office Action for U.S. Appl. No. 11/800,461 mailed Jul. 3, 2008.

(Continued)

*Primary Examiner*—Robert Beausoliel
*Assistant Examiner*—Amine Riad
(74) *Attorney, Agent, or Firm*—Blakely, Sokoloff, Taylor & Zafman LLP (57) ABSTRACT

A method and apparatus for diagnosing faults. A fault is detected. One or more process variables that contributed to the fault are determined. A relative contribution of each of the one or more process variables is determined. A determination is made as to which fault signatures match the fault, a match occurring when the relative contributions of the one or more process variables are within relative contribution ranges of the matching fault signature. Each fault signature is associated with at least one fault class.

21 Claims, 6 Drawing Sheets

U.S. PATENT DOCUMENTS

| | | |
|---|---|---|
| 2006/0111804 A1 | 5/2006 | Lin |
| 2006/0184264 A1 | 8/2006 | Willis et al. |
| 2007/0021859 A1 | 1/2007 | Lev-Ami et al. |
| 2007/0038418 A1 | 2/2007 | Ahn et al. |

OTHER PUBLICATIONS

Office Action for U.S. Appl. No. 11/800,471 mailed Aug. 5, 2008.

Chen, Kuang-Han et al., "Multivariate Statistical Process Control and Signature Analysis Using Eigenfactor Detection Methods", 2001, pp. 1-21.

Gallagher, Neal B. et al., "Development and Benchmarking of Multivariate Statistical Process Control Tools for a Semiconductor Etch Process: Improving Robustness Through Model Updating" *Eigenvector-Research Inc.*, Manson, WA, USA, 1997, 8 pages.

Li, W., et al. "Recursive PCA for Adaptive Process Monitoring", J. Process Control, vol. 10, p. 471-486, 2000.

PCT International Search Report and Written Opinion for International Application No. PCT/US08/05667, mailed Aug. 18, 2008, 10 pages.

PCT International Search Report and Written Opinion for International Application No. PCT/US07/11106, mailed Jul. 14, 2008, 8 pages.

PCT International Search Report and Written Opinion for International Application No. PCT/US07/11142, mailed Jul. 28, 2008, 11 pages.

Spitzlsperger, Gerhard et al. "Fault Detection for a VIA Etch Process Using Adaptive Multivariate Methods" ISSM Tokyo 2004, p. 528-533.

Case Study: "Automated Fault Detection and Diagnostic Software", New Buildings Institute; http://www.archenergy.com/pier-fdd/market_connection/proj7_Deliverables/FD-DAlgorithmsCaseStudyFinal.pdf. Apr. 17, 2007, 4 pages.

Gallagher, Neal B. et al., "Development and Benchmarking of Multivariate Statistical Process Control Tools for a Semiconductor Etch Process: Improving Robustness Through Model Updating" *Eigenvector-Research Inc.*, Manson, WA, USA, 1997, 6 pages.

Applied Materials, Inc. Office Action for U.S. Appl. No. 11/800,471 mailed Aug. 5, 2008, (809P005).

Applied Materials, Inc. Office Action for U.S. Appl. No. 11/800,462 mailed Apr. 2, 2009, (8090P026).

Applied Materials, Inc. Office Action for U.S. Appl. No. 11/985,603 mailed Apr. 8, 2009, (8090P026C).

\* cited by examiner

RANGED FAULT SIGNATURES FOR FAULT DIAGNOSIS

RELATED APPLICATIONS

This application claims priority to provisional application No. 60/746,649, filed on May 7, 2006, and to provisional application number 60/746,647, filed on May 7, 2006.

TECHNICAL FIELD

Embodiments of the present invention relate to fault diagnosis, and more specifically to fault diagnosis using ranged fault signatures.

BACKGROUND

Many industries employ sophisticated manufacturing equipment that includes multiple sensors and controls, each of which may be carefully monitored during processing to ensure product quality. One method of monitoring the multiple sensors and controls is statistical process monitoring (a means of performing statistical analysis on sensor measurements and process control values (process variables)), which enables automatic detection and/or diagnosis of faults. A "fault" can be a malfunction or maladjustment of manufacturing equipment (e.g., deviation of a machine's operating parameters from intended values), or an indication of a need for preventive maintenance to prevent an imminent malfunction or maladjustment. Faults can produce defects in the devices being manufactured. Accordingly, one goal of statistical process monitoring is to detect and/or diagnose faults before they produce such defects.

During process monitoring, a fault is detected when one or more of the statistics of recent process data deviate from a statistical model by an amount great enough to cause a model metric to exceed a respective confidence threshold. A model metric is a scalar number whose value represents a magnitude of deviation between the statistical characteristics of process data collected during actual process monitoring and the statistical characteristics predicted by the model. Each model metric is a unique mathematical method of estimating this deviation. Conventional model metrics include Squared Prediction Error (commonly referred to as SPE, Qres, or Q), and Hotelling's T2 (T2).

Each model metric has a respective confidence threshold, also referred to as a confidence limit or control limit, whose value represents an acceptable upper limit of the model metric. If a model metric exceeds its respective confidence threshold during process monitoring, it can be inferred that the process data has aberrant statistics because of a fault.

Once faults are detected, they are diagnosed by estimating a relative fault contribution of each process variable. Some faults are difficult to diagnose because they lack a straightforward (e.g., direct) correlation with a single process variable. Faults having complex and/or indirect correlations to multiple process variables can be especially difficult to diagnose.

Conventional methods of diagnosing faults generally require multiple occurrences of a fault before the fault can be classified. This is may be problematic for classifying faults that have complex correlations to multiple process variables.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for diagnosing faults. In one embodiment, a fault is detected. One or more process variables that contributed to the fault are identified. A process variable may contribute to the fault if it has a measured value outside of a control limit. A relative contribution of each of the one or more process variables is determined. The relative contributions may be normalized and arranged in an ordered list, with the order being based on a magnitude of fault contribution. A fault signature that matches the detected fault is determined. In one embodiment, a fault signature matches the detected fault if relative contributions of the identified process variables are within relative contribution ranges of the matching fault signature. Each of the fault signatures may be associated with at least one fault class that identifies a specific fault cause.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The following description provides details of a statistical process monitoring system that monitors processes run on manufacturing devices to detect and/or diagnose faults (manufacturing irregularities). In one embodiment, the statistical process monitoring system is for use in the manufacturing of electronic devices (e.g., semiconductors). Manufacturing such devices generally requires dozens of manufacturing steps involving different types of manufacturing processes. For example, etching, sputtering, and chemical vapor deposition are three different types of processes, each of which is performed on different types of machines. Alternatively, the statistical process monitoring system may be used to monitor the manufacture of other products, such as automobiles. The manufacture of such other products may also require many different processing steps by various manufacturing machines.

Figure 1:
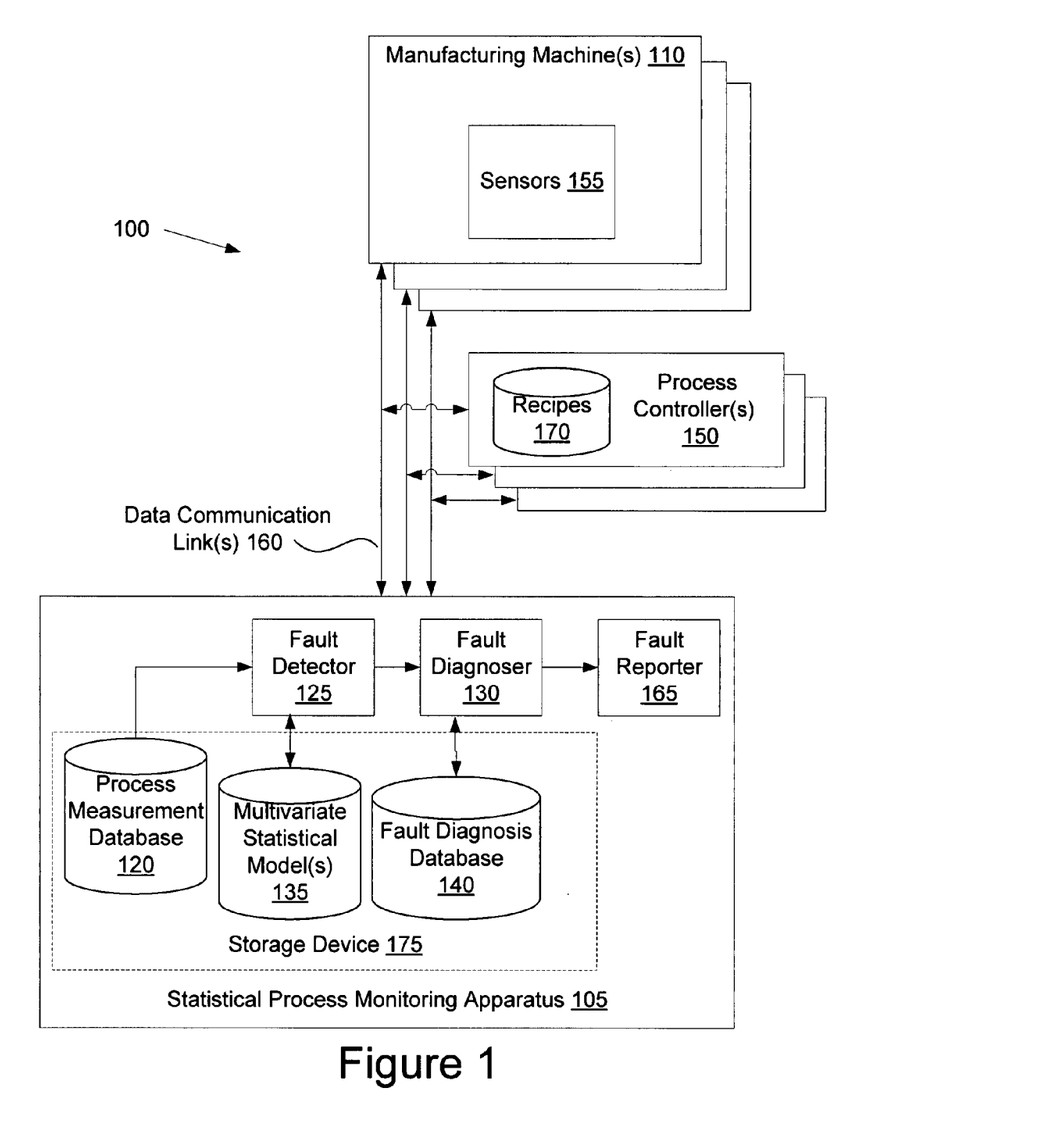
FIG. 1 illustrates one embodiment of a statistical process monitoring system.

FIG. 1 illustrates one embodiment of a statistical process monitoring system 100. The statistical process monitoring system 100 includes a statistical process monitoring apparatus 105 coupled with one or more manufacturing machines 110 and one or more process controllers 150 by data communication links 160. The statistical process monitoring system 100 may include all manufacturing machines 110 in a factory (e.g., a fabrication facility). Alternatively, the statistical process monitoring system 100 may include only some manufacturing machines 110 in the factory, such as all of the manufacturing machines 110 that run one or more specific processes.

In one embodiment, each of the manufacturing machines 110 is a machine for the manufacture of electronic devices, such as etchers, chemical vapor deposition (CVD) furnaces, photolithography devices, implanters, etc. Alternatively, the manufacturing machines 110 may be of a type for manufacturing other products (e.g., automobiles). In one embodiment, each of the manufacturing machines 110 is of a single type. Alternatively, the manufacturing machines 110 may include multiple different types of equipment, each of which may run different processes.

Each of the manufacturing machines 110 may include multiple sensors for monitoring processes run on the manufacturing machines 110. One type of sensor that may be included in the manufacturing machine is a temperature sensor. Examples of other sensors include pressure sensors, flow rate sensors, or any other sensors that monitor physical conditions of a manufacturing process or physical properties of a work piece manufactured by the manufacturing machines 110.

Each manufacturing process that is performed on a manufacturing machine 110 is characterized by various physical conditions and properties measured by the sensors, and by various operating parameters, collectively referred to as process data. Each distinct physical condition or property measured by sensors, and each operating parameter, may be a distinct process variable of the process data. Examples of process variables representing sensor data include chamber pressure, susceptor temperature, RF forward power, and RF reflected power. Examples of process variables representing operating parameters include flow rate settings (e.g., of chemical reagents), and throttle valve settings (e.g., for a chamber exhaust vacuum pump). The sensors, manufacturing machines and process controllers may be monitored during processing to gather the process variables at successive points in time.

In one embodiment, each process variable applies to a specific process. Alternatively, one or more process variables may apply to only portions of a specific process. In one embodiment, sensor measurements and operating parameters for different steps in a process represent distinct process variables (modeled as additional dimensions in model space). This may be useful, for example, if a manufacturing process being performed in a machine has multiple steps with different operating parameter settings. For example, in a three step manufacturing process, a susceptor temperature during the three steps would be treated as three distinct process variables. The division of process steps into separate dimensions in model space may be advantageous, for example, when a single process deposits multiple layers on a workpiece, or when different steps of a process expose the workpiece to different process conditions (e.g., pressure, temperature, etc.).

Process controllers 150 control operating parameters of manufacturing machines 110. For example, process controllers 150 may control chamber temperature, vacuum pumps, gas injection systems, etc. of manufacturing machines 110. Process controllers 150 may store one or more process recipes (recipes) 160. Each recipe 160 may define operating parameters of a manufacturing machine 110 at each step of a process. In one embodiment, recipes 160 may be loaded into manufacturing machines 110 by process controllers 150.

Data communication links 160 may include conventional communication links, and may be wired or wireless. Data may be transmitted between the manufacturing machines 110, the process controllers 150 and the statistical process monitoring apparatus 105 in a raw or processed format. In one embodiment, a semiconductor equipment communications standards (SECS) interface is used. In other embodiments, a generic model for communications and control of manufacturing equipment (GEM) interface, a SECS/GEM interface, a high speed SECS message services (HSMS) interface, etc., may be used.

The statistical process monitoring apparatus 105 may be a single server that analyzes incoming process data from the manufacturing machines 110, sensors 155 and process controllers 150. Alternatively the statistical process monitoring apparatus 105 may include multiple servers and/or computers. The statistical process monitoring apparatus 105 in one embodiment includes a fault detector 125, a fault diagnoser 130 and a fault reporter 150. The statistical process monitoring device 105 may also include a storage device 175. In one embodiment, the statistical process monitoring apparatus 105 is included in one or more of the process controllers 150. Alternatively, the process monitoring apparatus 105 may be a distinct separate apparatus.

Storage device 175 may include a process measurement database 120, one or more multivariate statistical models 135, and a fault diagnosis database 140. In one embodiment, the storage device 175 is a single storage device of a computer or server of the statistical process monitoring apparatus 105. Alternatively, the storage device 175 may be external to the statistical process monitoring apparatus 105. In one embodiment, the storage device 175 includes multiple storage devices, some of which may include redundant copies of data for backup.

Process measurement data (process data) may be stored in process measurement database 120. The stored process data may be used to show drifts and trends for each of the manufacturing machines 110, for processes run on the manufacturing machines 110, etc. In one embodiment, the stored process data is used to generate one or more multivariate statistical models 135, as described below. Once generated, the multivariate statistical models 135 may be stored in storage device 175.

Fault diagnosis database 140 includes multiple fault classes and fault signatures, which are described in greater detail below. In one embodiment, fault diagnosis database 140 is a relational database. For example, fault diagnosis database 140 my include a fault classes table that stores a list of fault classes, and a related fault signatures table that stores defining characteristics of fault signatures.

In one embodiment, a training period is used to collect data for the generation of one or more multivariate statistical models. The training period covers a collection of process runs of a specific manufacturing process completed under known and/or controlled conditions on a particular manufacturing machine or manufacturing machines. Process data gathered from process runs completed during the training period may be used to generate statistics such as mean, variance, covariance matrix, etc. These statistics are used collectively to generate one or more multivariate statistical models 135, generally for a specific process that runs on a specific machine. An initial set of fault signatures can also be created and added to the fault diagnosis database 140 based on process data collected during the training period. A fault signature is a characterization of process conditions representative of a specific fault or faults. The fault signature may be a list, table, or other data structure that includes process variables that contribute to a specific fault or faults.

In one embodiment, each multivariate statistical model applies to only a single manufacturing machine. Alternatively, process data from two or more manufacturing machines 110 of a matching machine type may be aggregated to establish a single fault diagnosis model (multivariate statistical model) that may apply to one or more processes run on the two or more manufacturing machines. Moreover, a fault diagnosis model developed for a first manufacturing machine may be applied to a second machine of the same type (e.g., same model).

Each multivariate statistical model 135 may include one or more model metrics. Model metrics are scalar values that characterize an amount of deviation between a set of process data and a model. In one embodiment, the model metrics include Squared Prediction Error (commonly referred to as SPE, Qres, or Q) and Hotellings T2. Model metrics may also include combined metrics such as the Combined Multivariate Index (CMI). Each of these metrics is a different method of estimating the probability that process data being monitored has the same statistics as training data that was used to build the model. The aforesaid statistics and metrics may be calculated in accordance with conventional statistics algorithms.

One or more of the multivariate models may utilize Principal Components Analysis (PCA) to transform an M-dimensional process variable space to an N-dimensional space of mutually orthogonal principal components, where M is the number of process variables, and N is much smaller than M. PCA calculates a set of M eigenvectors and M eigenvalues, where each respective eigenvector transforms process variable data to a respective dimension of the principal component space, and each eigenvalue is proportional to the amount of variance represented by a corresponding eigenvector. To simplify (reduce the dimension of) the principal component space, the N eigenvectors corresponding to the N largest eigenvalues are retained in the model; the other eigenvectors are discarded or ignored. The number N of principal components retained in the model is a parameter of the model that may be user selected. The number of principal components (N) may be chosen based on a tradeoff between a model explaining less of the data variance when using a smaller value of N and the model being over-specified when using a larger value of N.

Once one or more multivariate statistical models have been generated, they may be used by fault detector 125 to monitor processes run on manufacturing machines 110. Fault detector 125 analyzes process data by executing various statistical process monitoring methods, each of which is based on at least one multivariate statistical model. In one embodiment, fault detector 125 receives process measurement data (process data) directly from the manufacturing machines 110, sensors 155 and/or process controllers 150. In another embodiment, fault detector 125 may receive process data from the process measurement database 120. In yet another embodiment, fault detector 125 receives process data from both sources.

To detect faults, fault detector 125 calculates statistics of process data for processes being monitored, and compares the calculated statistics with corresponding statistics of appropriate multivariate statistical models. The statistics may be compared for one model metric, or for multiple model metrics (e.g., T2, SPE, CMI). If one or more of the model metrics exceeds a predetermined threshold (referred to as a confidence limit or control limit), a fault may be detected. In one embodiment, each model metric has a threshold value that is user selected. The chosen threshold may represent a compromise between risk of a false alarm (if the threshold is too low) and risk of failing to detect a fault (if the threshold is too high). Where multiple metrics are calculated, faults may be triggered if any one of the metrics exceeds threshold values. Alternatively, some faults may be triggered only if certain metrics exceed threshold values or only if multiple metrics exceed threshold values.

Once a fault has been identified by the fault detector 125, the fault is analyzed by fault diagnoser 130. Fault diagnoser 130 compares the fault to a collection of fault signatures stored in the fault diagnosis database 140. Each fault signature represents process conditions representative of a specific fault or faults. In one embodiment, fault signatures are ranked lists of process variables that have a greatest statistical contribution to a specific fault or faults. The process variables may be ranked in the order of relative magnitudes of their respective contributions. Alternatively, fault signatures may include tables, trees, or other data structures that rank process variables based on statistical contributions to a fault. Fault diagnoser 130 may compare each stored fault signature to a ranked list of process variables having greatest contributions for a current fault. When there is a high degree of similarity between one of the fault signatures and the current fault, a match is reported.

Each of the fault signatures is associated with one or more fault classes stored in the fault diagnosis database 140. The fault classes may indicate an actual problem that generated a current fault, or a probable cause of the current fault. For example, if the fault signature indicates that the greatest contributing process variable was silane flow rate, the fault class may indicate that a valve that feeds silane into a chamber has malfunctioned.

The fault classes each include one or more parameters that collectively define the fault class. In one embodiment, a fault class includes a single parameter (e.g., a single database field) that describes the fault class with sufficient specificity to be meaningful to a user. In another embodiment, a fault class includes multiple parameters that specify, for example, a specific machine, a specific component within a machine, etc. to which the fault class applies. For example, a fault class may be for an upper chamber liner that needs cleaning in a specific manufacturing machine 110.

Fault reporter 165 generates fault reports indicating which fault class or fault classes 145 apply to a current fault. The fault reports may be sent to one or more clients (not shown) (e.g., local computers, remote computers, personal digital assistances (PDAs), pagers, cell phones, etc.) that are networked to the statistical process monitoring apparatus 105. Fault reporter 165 may also cause manufacturing machines 110 to be shut down, cause a machine to alarm, or cause other appropriate actions.

Figure 2:
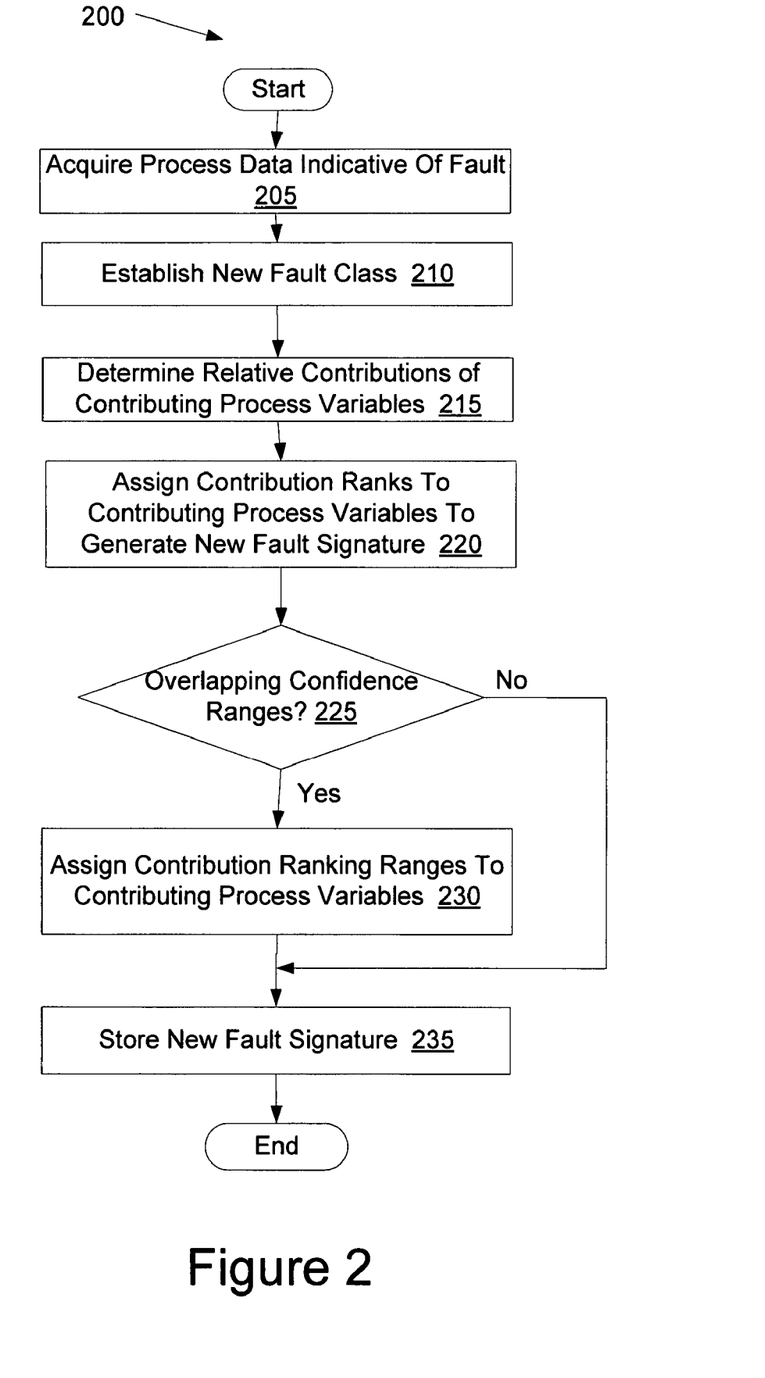
FIG. 2 illustrates a flow diagram of one embodiment for a method of generating fault classes.

FIG. 2 illustrates a flow diagram of one embodiment for a method 200 of generating fault classes. The method may be performed by processing logic that may comprise hardware (e.g., circuitry, dedicated logic, programmable logic, microcode, etc.), software (such as instructions run on a processing device), or a combination thereof. In one embodiment, method 200 is performed by the statistical process monitoring apparatus 105 of FIG. 1.

Referring to FIG. 2, method 200 begins with acquiring process data indicative of a fault (block 205). The process data can be acquired from one or more of manufacturing machines, sensors, process controllers, and a process measurement database. The process data may include, for example, chamber temperature, pressure, gas flow rates, etc. The process data may be indicative of a fault if, for example, the temperature is too high or too low, the gas flow rates are erratic, the pressure is different than is required for a current process, etc. The process data may be collected during a training period or during actual process monitoring of manufactured products. The fault may be intentionally induced to generate the process data, or the fault may be unintentionally produced. In one embodiment, the process data is acquired before a fault is discovered to have occurred, and upon analysis of the process data a fault is triggered.

At block 210, a new fault class is established (block 205). In one embodiment, the new fault class is established by storing one or more parameters that collectively define the fault class in a fault diagnosis database. The one or more parameters may define the fault class with sufficient specificity to identify one or more possible fault causes. The new fault class may be established after a single occurrence of a particular fault.

At block 215, relative contributions of process variables that contributed to the fault are determined. Contributing process variables may be ranked in an order that corresponds to the relative magnitudes of their respective contributions, hereinafter referred to as fault contributions. The respective fault contributions of the process variables can be determined by any conventional statistical method. One exemplary method of determining relative contributions of process variables to a detected fault is disclosed in S. Joe Qin, Sergio Valle, Michael J. Piovoso, "On Unifying Multiblock Analysis with Application to Decentralized Process Monitoring," J. Chemometrics 2001, vol. 15, pages 715-742, which is herein incorporated by reference. Another exemplary method of determining relative contributions of process variables to a detected fault is disclosed in A. K. Conlin, E. B. Martin, A. J. Morris, "Confidence Limits For Contribution Plots," J. Chemometrics 2000, col. 14, pages 725-736, which is herein incorporated by reference. Yet another exemplary method of determining relative contributions of process variables to a detected fault is disclosed in Johan A. Westerhuis, Stephen P. Gurden, Age K. Smilde, "Generalized Contribution Plots in Multivariate Statistical Process Monitoring," Chemometrics and Intelligent Laboratory Systems 2000, vol. 51, pages 95-114, which is herein incorporated by reference. Other methods of determining relative contributions may also be used.

In one embodiment, the fault contributions are independent of a statistical method used to determine the fault contributions. Accordingly, parameters specific to certain statistical methods (e.g., covariance matrices, principal component eigenvectors, etc.) may not be incorporated into the fault class and/or a fault signature associated with the fault class. Therefore, the fault class may be equally applicable to any appropriate statistical methods (e.g., statistical methods with adaptive models (e.g., models that adapt certain parameters over time) and statistical methods that use static models). In the case of a statistical method using an adaptive model, the model may include principal components analysis (PCA) in which a number of principal components is adapted and/or a transformation from process variable space to principal component space is adapted.

In one embodiment, fault contributions of the process variables are determined independently by two or more different statistical methods (e.g., with a static model and an adaptive model). This may be advantageous because different statistical models may more accurately determine fault contributions for different faults.

At block 220, contribution ranks are assigned to contributing process variables to generate a new fault signature. In one embodiment, a subset of the contributing process variables is selected. The subset may include those process variables whose fault contribution is greater than a contribution threshold value, hereinafter referred to as the significance limit. The significance limit may be calculated according to various methods, including for example the methods of the Qin, et al., Conlin et al., and Westerhuis et al. discussed above. Consecutively numbered rankings may then be assigned to the process variables in the subset based on the order of relative magnitudes of their respective contributions.

Process variables outside of the selected subset (fault contribution less than the significance limit) may be assigned a fault contribution ranking of none or zero, or may be omitted from the fault signature. In one embodiment, the significance limit is predetermined. Alternatively, the significance limit may be determined at the time that the new signature value is generated using one or more statistical methods (e.g., a statistical method used to determine each process variable's respective fault contribution). Use of a significance limit may improve noise immunity by excluding from a diagnosis of a given fault all process variables whose contribution to that fault is statistically insignificant. Examples of fault signatures that include a significance limit are illustrated in Table 1 and Table 2 below.

In one embodiment, there is no limit on the number of process variables that may be included in a new fault signature. Therefore, any number of process variables may be included in a fault signature, so long as those process variables each have fault contributions that meet the significance limit. Alternatively, an upper and/or lower limit may be placed on the number of contributing process variables to a fault signature.

At block 225, processing logic determines whether the contributing process variables have respective fault contributions that differ by less than a threshold value, hereinafter referred to as the variation limit. The variation limit may be user selected or selected automatically. The variation limit may be a fixed value, or it may be a relative value (e.g., based on a percentage of the fault contribution of one of the process variables). In one embodiment, a statistical confidence range is calculated for the fault contribution of each process variable. The variation limit may be based on the calculated statistical confidence ranges for the process variables. In one embodiment, the process variables differ by less than the variation limit if they have overlapping confidence ranges.

If the process variables differ by less than the variation limit (e.g., have overlapping confidence ranges), the method proceeds to block 230. If the process variables do not differ by less than the variation limit, the method proceeds to block 235. In one embodiment, the method proceeds to block 235 whether or not the process variables differ by less than the variation limit.

At block 230, contribution ranking ranges are assigned to one or more contributing process variables. Each contribution ranking range includes contribution ranks of each process variable that differs by less than the variation limit. Each of these process variables are assigned a ranking range that includes both that process variable's own contribution rank and the contribution ranks of the other included process variables. In one embodiment, the ranking range is a range of consecutively numbered contribution ranks. For example, a ranking range may be 1-2, which includes the contribution rank 1 of a first process variable and the contribution rank 2 of a second process variable. Different process variables may have identical or overlapping ranking ranges. Defining fault signatures by ranking ranges instead of or in addition to absolute contribution ranks may improve noise immunity (e.g., where a relative ranking between process variables is likely to be interchanged by expected statistical fluctuations). Examples of fault signatures having ranking ranges are illustrated below in Table 3 and Table 4.

At block 235, the new fault signature is stored in the fault diagnosis database. The stored fault signature is associated with the new fault class. In one embodiment, the actual contribution values (e.g, 0.9, 0.5, etc.) of each process variable to the fault signature are not stored, and instead the contribution ranking is stored (e.g., 1, 2, 3, etc.). Alternatively, the actual contribution values may be stored, or both the contribution values and the contribution rankings may be stored.

TABLE 1

First Fault Signature

| Process Variable | Contribution To Fault | Contribution Rank |
|---|---|---|
| A | 0.9 | 1 |
| B | 0.8 | 2 |
| C | 0.4 | 3 |
| D | 0.2 | none |
| E | 0.07 | none |
| F | <0.02 | none |
| G | <0.02 | none |
| H | <0.02 | none |

Table 1 illustrates a first fault signature generated according to method 200 of FIG. 2. The statistical contributions of process variables A, B, C, D, and E are determined to be 0.9, 0.8, 0.4, 0.2 and 0.07, respectively, in accordance with a first statistical analysis method. The statistical contributions of the remaining process variables F, G and H are determined to be less than 0.02. The process variables are ranked in the order of the magnitudes of their contributions to a fault. The first fault signature has a significance limit of 0.3, and thus process variables A, B and C are considered to contribute to the fault, and are part of the first fault signature. Process variables D through H are excluded from the first fault signature because their fault contributions are less than the significance limit.

TABLE 2

Second Fault Signature

| Process Variable | Contribution To Fault | Contribution Rank |
|---|---|---|
| A | 0.9 | 1 |
| B | 0.8 | 2 |
| C | 0.4 | 3 |
| D | 0.2 | none |
| E | 0.07 | none |
| F | <0.02 | none |
| G | <0.02 | none |
| H | <0.02 | none |

Table 2 illustrates a second fault signature generated according to method 200 of FIG. 2. The same process data used to generate the first fault signature of Table 1 is used to generate the second fault signature. The process variables are ranked in the order of the magnitudes of their contributions to a fault. The second fault signature has a significance limit of 0.1, and thus process variables A, B, C and D are considered to contribute to the fault.

TABLE 3

Third Fault Signature With Ranking Range

| Process Variable | Contribution To Fault | Confidence Range | Contribution Rank | Ranking Range |
|---|---|---|---|---|
| A | 0.9 | 0.82-0.98 | 1 | 1-2 |
| B | 0.8 | 0.73-0.87 | 2 | 1-2 |
| C | 0.4 | 0.45-0.55 | 3 | 3 |
| D | 0.2 | 0.15-0.25 | 4 | 4 |
| E | 0.07 | 0.06-0.11 | none | none |
| F | <0.02 | N/A | none | none |

TABLE 3-continued

Third Fault Signature With Ranking Range

| Process Variable | Contribution To Fault | Confidence Range | Contribution Rank | Ranking Range |
|---|---|---|---|---|
| G | <0.02 | N/A | none | none |
| H | <0.02 | N/A | none | none |

Table 3 illustrates a third fault signature generated according to method 200 of FIG. 2. The third fault signature includes a ranking range determined by the respective confidence ranges of the process variables. The column titled "confidence range" shows the upper and lower limits of the confidence range for the fault contribution of each process variable. The confidence ranges for process variables A and B overlap because the lower limit of the confidence range of variable A (0.82) is lower than the upper limit of the confidence range of variable B (0.87). Consequently, process variables A and B, which have respective contribution rankings (ranks) of 1 and 2 based on their calculated fault contributions, are each assigned a ranking range that includes each other's contribution ranking (each are assigned a ranking range of 1-2).

The third fault signature has a significance limit of 0.1, and thus process variables A, B, C and D are considered to contribute to the fault, and are part of the first fault signature. Process variables E through H are excluded from the first fault signature because their fault contributions are less than the significance limit. In one embodiment, process variable E would be included in the fault signature because the upper limit of its confidence range is greater than the significance limit of 0.1.

In one embodiment, at least a list of contributing process variables (identified by name or other indicator) and a ranking range of each contributing process variable is included in the fault signature. Optionally, one or more of the calculated fault contribution, confidence range and contribution rank may also be included as part of the fault signature.

TABLE 4

Fourth Fault Signature With Ranking Range

| Process Variable | Contribution To Fault | Confidence Range | Contribution Rank | Ranking Range |
|---|---|---|---|---|
| A | 0.9 | 0.82-0.98 | 1 | 1-2 |
| B | 0.8 | 0.73-0.87 | 2 | 1-3 |
| C | 0.7 | 0.65-0.75 | 3 | 2-3 |
| D | 0.2 | 0.15-0.25 | 4 | 4 |
| E | 0.07 | 0.06-0.11 | none | none |
| F | <0.02 | N/A | none | none |
| G | <0.02 | N/A | none | none |
| H | <0.02 | N/A | none | none |

Table 4 illustrates a fourth fault signature generated according to method 200 of FIG. 2. The fourth fault signature is identical to the fault signature of Table 3, except that the calculated fault contribution and ranking range of process variable C is different. In this example, the confidence range for the fault contribution of process variable B overlaps both the confidence range for variable A and the confidence range for variable C. Consequently, the ranking range for variable B includes both variable A's contribution rank (1), and variable C's contribution rank (3), as well as its own contribution rank (2). Therefore the ranking range for process variable B is 1-3. Because process variable A has a confidence range that overlaps the confidence range of variable B, process variable A has a ranking range of 1-2. Likewise, the confidence range of process variable C overlaps the confidence range of process variable B, and thus process variable C has a ranking range of 2-3.

Figure 3:
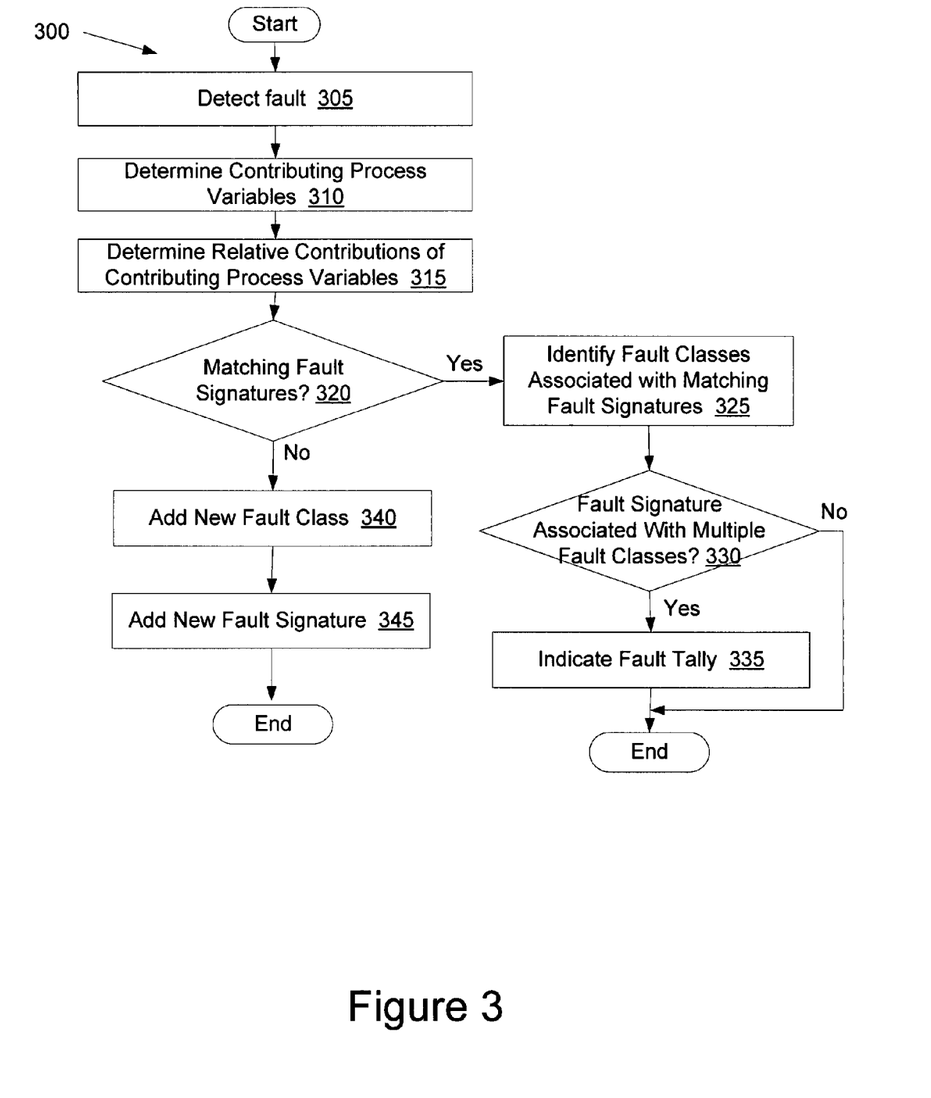
FIG. 3 illustrates a flow diagram of one embodiment for a method of diagnosing faults by using fault signatures.

FIG. 3 illustrates a flow diagram of one embodiment for a method 300 of diagnosing faults by using fault signatures. The method may be performed by processing logic that may comprise hardware (e.g., circuitry, dedicated logic, programmable logic, microcode, etc.), software (such as instructions run on a processing device), or a combination thereof. In one embodiment, method 300 is performed by the statistical process monitoring apparatus 105 of FIG. 1.

Referring to FIG. 3, method 300 begins with processing logic detecting a fault (block 305). In one embodiment the fault is detected based on process data that is received from one or more of a manufacturing machine, sensors, process controllers, and a process measurement database. At block 310, process variables that contributed to the fault are determined. A process variable may contribute to a fault if it exceeds a control limit, or otherwise contributes to an unexpected and/or undesired result.

At block 315, processing logic determines relative contributions of the contributing process variables. In one embodiment, processing logic ranks the process variables in the order of the relative magnitudes of their respective contributions to the detected fault. The detected fault ranking may or may not include the numerical values of the fault contributions of the process variables. In one embodiment, the detected fault ranking is merely an ordered list of the process variables. For example, if the relative contributions to the detected fault of process variables A, B, C, D and E are 0.6, 0.9, 0.5, 0.4, and 0.1, respectively, then the detected fault ranking would be the ordered list B, A, C, D, E.

In one embodiment, processing logic also determines a significance limit to the fault contributions such that any fault contribution below the significance limit can be considered insignificant (and ignored). Process variables that have a value less than the significance limit may be excluded from the detected fault ranking, or assigned a detected fault ranking of none or zero. In the example of the preceding paragraph, if the significance limit of the fault contributions is 0.2, then the process variable E would be excluded, and the detected fault ranking would be B, A, C, D.

At block 320, processing logic determines which of the fault signatures match the detected fault. This may be accomplished by comparing the detected fault ranking to each established fault signature. In one embodiment, if the detected fault ranking exactly matches one of the fault signatures, then the detected fault is diagnosed as being of a fault class associated with the fault signature. When comparing a detected fault ranking to a fault signature having ranking ranges, an exact match occurs if the ranking of each process variable in the detected fault falls within the ranking range of the same process variable in the fault signature. In one embodiment, a detected fault may match multiple fault signatures. In such an occurrence, each of the fault signatures is reported.

If a match is detected between a fault ranking of the current fault and an existing fault signature, the method proceeds to block 325. If no match is detected with an existing fault signature, the method proceeds to block 340.

In one embodiment, at least one matching fault signature is a composite fault signature. A composite fault signature is a fault signature that includes separate contribution rankings and/or ranking ranges that are separately calculated for different statistical models. For example, a first process variable of a composite fault signature might have a contribution rank of 1 as calculated by a first statistical model (e.g., an adaptive model) and a contribution rank of 2 as calculated by a second statistical model (e.g., a static model). Therefore, during process monitoring, a detected fault contribution would include for each process variable a separate ranking determined by each of the appropriate statistical models. This may be advantageous because different statistical models may more accurately determine the fault contribution of the process variables in response to different types of faults.

TABLE 5

Composite Fault Signature

| Process Variable | First Model Ranking Range | Second Model Ranking Range |
| --- | --- | --- |
| A | 1-2 | 3-4 |
| B | 1-2 | 3-4 |
| C | 3 | 1 |
| D | none | 2 |
| E | none | none |
| F | none | none |

TABLE 6

Detected Fault Using First and Second Statistical Models

| Process Variable | First Model Contribution Rank | Second Model Contribution Rank |
| --- | --- | --- |
| A | 2 | 3 |
| B | 1 | 4 |
| C | 3 | 1 |
| D | 4 | 2 |
| E | none | none |
| F | none | none |

Table 5 illustrates an example of a composite fault signature, in accordance with one embodiment of the present invention. Table 6 illustrates a detected fault having a composite fault ranking produced by the simultaneous use of two models, in accordance with another embodiment of the present invention. As shown, separately determining the ranking ranges and/or contribution ranks of the same process data using the two different models may produce different results. The fault signature of Table 5 shows an exact match of the detected fault of Table 6, because the fault contribution rank in Table 6 of each process variable for each model is within the ranking range of the corresponding process variable and model of the composite fault signature of Table 5.

In some instances a fault may be detected by a first model but not by a second model. Consequently, the fault contributions of the process variables for the second model are likely to be insignificant (e.g., below the significance limit), and therefore not useable for classification. In that case, processing logic may establish a composite fault signature in which every process variable for the second model has a ranking range and/or contribution rank of none.

Returning to FIG. 3, at block 325, processing logic identifies fault classes associated with the matching fault signatures. In one embodiment, each fault signature is associated with a single fault class. Alternatively, multiple fault classes may be associated with a fault signature. This may occur, for example, where two fault classes have the same fault signature.

At block 330, processing logic determines whether any of the matching fault signatures is associated with multiple fault classes. If a fault signature is associated with multiple fault classes, the method proceeds to block 335. If no fault signatures are associated with multiple fault classes, then the method ends. Alternatively, the method may end whether or not any fault signatures are associated with multiple fault classes.

At block 335, a tally is reported, the tally including a number of times that each of the fault classes associated with the matching fault signature were an actual cause of a fault. This may be useful to aid a user in identifying an actual cause of a present fault. The tally may be stored in the fault diagnosis database. In one embodiment, after an actual cause of the current fault is identified, that actual cause is entered into the tally in the fault diagnosis database.

At block 340, a new fault class is established. At block 345, a new fault signature is generated, which may be associated with the new fault class. The new fault class and new fault signature may be generated according to method 200 of FIG. 2. Alternatively, other methods of generating the new fault class and new fault signature may be used. Accordingly, new fault classes and new fault signatures can be added (e.g., to a multivariate statistical model) as new faults are encountered during actual processing of product. In one embodiment, only a single example of a fault is required to add a new fault class and an associated new fault signature.

Figure 4:
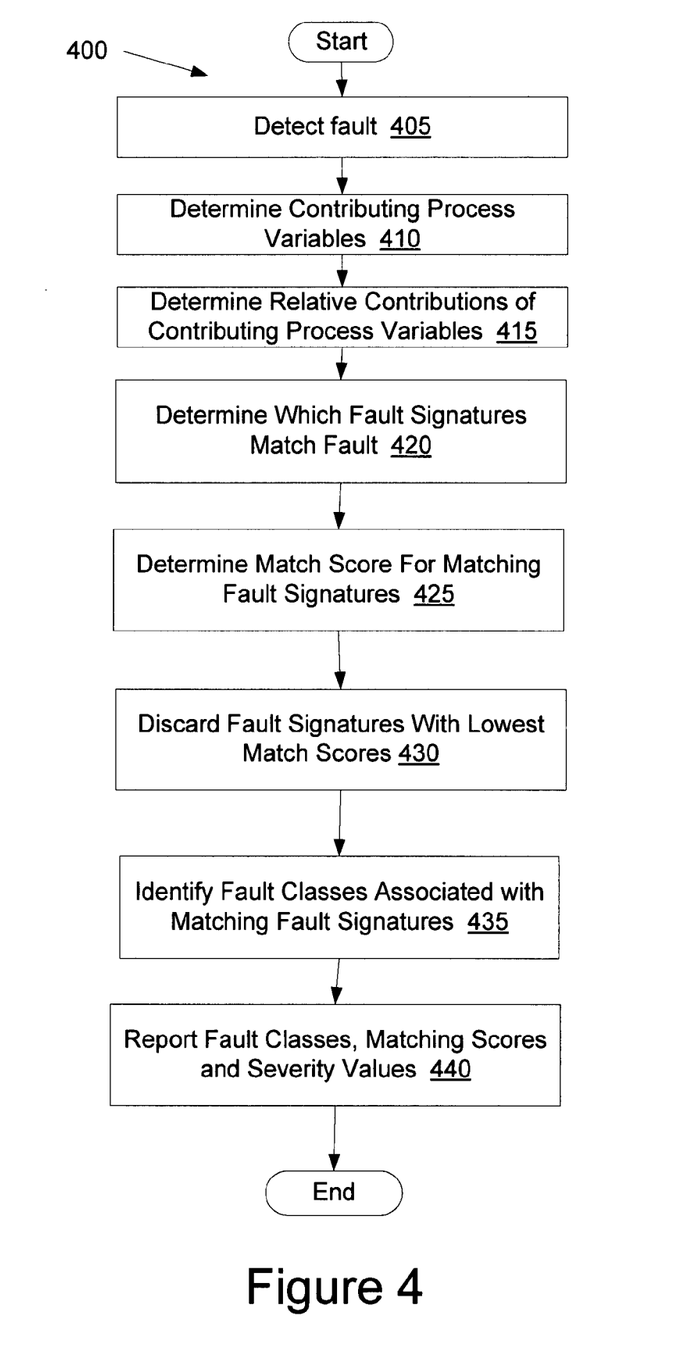
FIG. 4 illustrates a flow diagram of another embodiment for a method of diagnosing faults by using fault signatures.

FIG. 4 illustrates a flow diagram of another embodiment for a method 400 of diagnosing faults by using fault signatures. The method may be performed by processing logic that may comprise hardware (e.g., circuitry, dedicated logic, programmable logic, microcode, etc.), software (such as instructions run on a processing device), or a combination thereof. In one embodiment, method 400 is performed by the statistical process monitoring apparatus 105 of FIG. 1.

Referring to FIG. 4, method 400 begins with processing logic detecting a fault (block 405). At block 410, process variables that contributed to the fault are determined. At block 415, the relative contributions of the contributing process variables are determined.

At block 420, the fault signatures that match the fault are determined. In one embodiment, only fault signatures that completely match the fault are considered. Alternatively, fault signatures that partially match a detected fault may be considered. This may be useful, for example, when multiple faults occur concurrently. In such a case, no fault signature would exactly match the detected fault, even though one or more of the fault signatures may be associated with fault classes that represent actual causes of the detected fault. In one embodiment, fault signatures that partially match a detected fault are only considered if no exact match is found. Alternatively, partial matches are considered whether or not a complete match is discovered. This may be advantageous, for example, to ensure that a user is alerted of severe faults (e.g., faults that cause considerable yield loss) associated with fault signatures having partial matches.

At block 425, a match closeness score is determined for each of the fully and/or partially matching fault signatures. A match closeness score represents a degree of similarity between a fault signature and a detected fault. Match closeness scores may be calculated in various ways. In one embodiment, a match closeness score is determined by assigning a value of 2 for each process variable whose detected fault ranking is within an appropriate ranking range of a given fault signature, and a value of 1 for every other process variable that has a significant fault contribution (e.g., a fault contribution above the significance limit) in both the actual ranking of the current detected fault and the given fault signature. In another embodiment, the preceding values of 2 and 1 are multiplied by a weighting factor that is higher for process variables whose ranking is higher.

At block 430, fault signatures with the lowest match closeness scores are discarded. In one embodiment, all fault signatures are discarded except for X fault signatures having the highest match closeness scores. In another embodiment, all fault signatures that have a fault contribution below a threshold value are discarded. In yet another embodiment, no matching fault signatures are discarded.

At block 435, the fault classes associated with the matching fault signatures are identified. At block 440, the identified fault signatures are reported along with matching scores and fault severity values for each fault class. In one embodiment, each fault class includes a fault severity value. Fault classes having a low fault severity value may cause little to no harm to a manufactured product, while fault classes with a high severity may significantly reduce product yield. Therefore, fault severity values can alert a user as to how important a fault may be. For example, a fault class associated with a fault signature that has a high match closeness score but a low fault severity level may not be of concern. However, a fault class associated with a fault signature having a low match closeness score but a high fault severity level may be cause for concern.

As new instances of faults matching a fault signature that has a ranking range are acquired, it may be desirable to divide the fault signature into multiple fault signatures. Dividing a fault signature may be desirable if, for example, the fault class associated with the fault signature can be divided into narrower fault classes, or if it is discovered that the original fault signature produces an erroneous fault diagnosis that can be corrected by dividing the fault signature. One embodiment for such a method of dividing a fault signature and/or a fault class is explained in FIG. 5 below.

Figure 5:
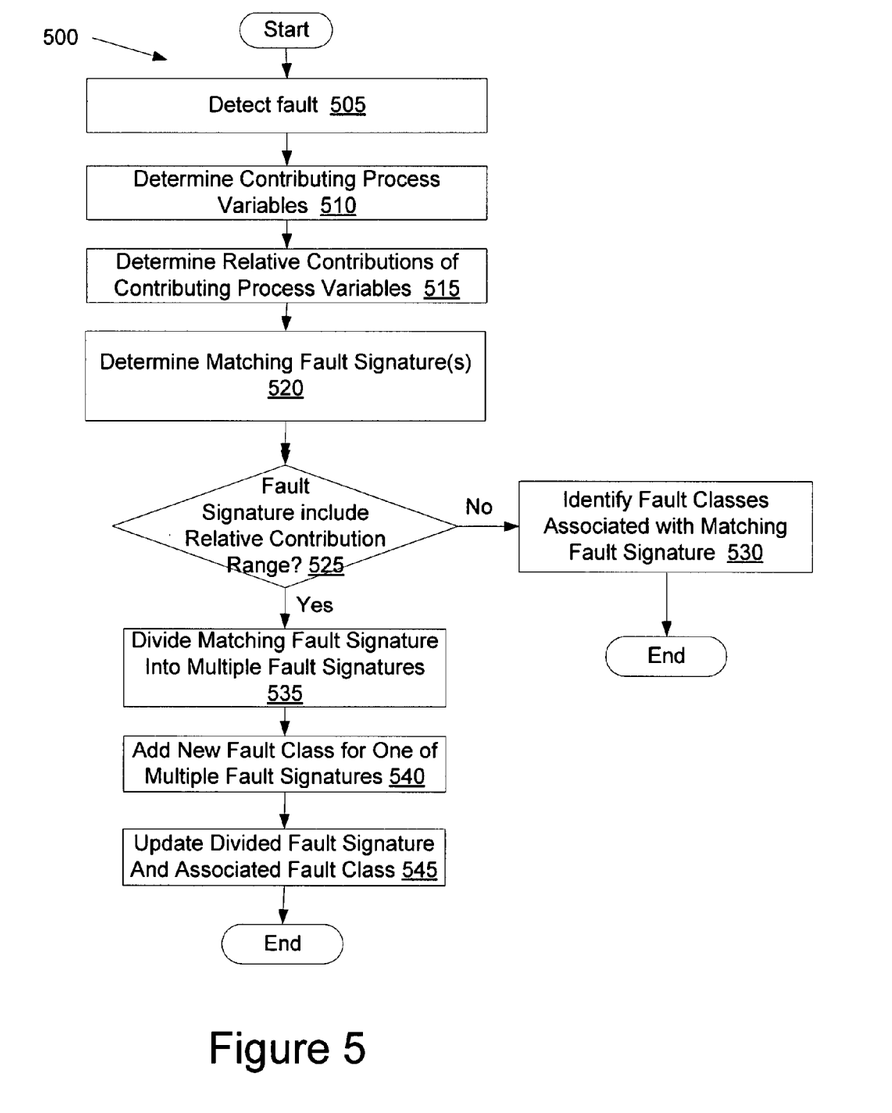
FIG. 5 illustrates a flow diagram of yet another embodiment for a method of diagnosing faults by using fault signatures.

FIG. 5 illustrates a flow diagram of yet another embodiment for a method 500 of diagnosing faults by using fault signatures. The method may be performed by processing logic that may comprise hardware (e.g., circuitry, dedicated logic, programmable logic, microcode, etc.), software (such as instructions run on a processing device), or a combination thereof. In one embodiment, method 500 is performed by the statistical process monitoring apparatus 105 of FIG. 1.

Referring to FIG. 5, method 500 begins with processing logic detecting a fault (block 505). At block 510, process variables that contributed to the fault are determined. At block 515, relative contributions of the contributing process variables are determined. At block 520, the fault signatures that match the fault are determined.

At block 525, processing logic determines whether the fault signatures include a relative contribution range. If one of the fault signatures does include a relative contribution range, the method proceeds to block 535. If none of the fault signatures includes a relative contribution range, the method proceeds to block 530.

At block 530, fault classes associated with the matching fault signature are identified. The method then ends.

At block 535, the determined fault signature is divided into multiple fault signatures. For example, in one embodiment, the determined fault signature is divided into two distinct fault signatures. The two distinct fault signatures may differ by having at least one process variable whose respective ranking ranges in the two new fault signatures are different subsets of that variable's ranking range in the original fault signature, examples of which are shown in tables 7, 8 and 9.

At block 540, a new fault class is added for one or more of the multiple fault signatures. The new fault class may be a subset of a fault class associated with the original fault signature that was divided. For example, if the original fault class was "defective electrostatic chuck," the new fault class could be "defective electrostatic chuck because of particles on wafer backside."

At block 545, at least one of the original fault signature and its associated fault class are updated. Updating may include narrowing ranking ranges for one or more process variables of a fault signature, and/or narrowing a fault class descriptor. For example, if the original fault class was originally for a "defective electrostatic chuck," the original fault class may be narrowed to "defective electrostatic chuck because of residue accumulation."

It may be useful to divide a fault into a fault signature that is associated with an underlying fault that most commonly affects two process variables, wherein a slightly different underlying cause affects one of the two process variables. An example is the different failure modes of an electrostatic chuck commonly used to hold a semiconductor work piece on a cathode electrode within a semiconductor process chamber. Two process variables that would preferably be monitored to diagnose faults in an electrostatic chuck are a flow rate of helium pumped into a cavity between a work piece and a chuck, and a process control parameter value that represents a capacitance of an adjustable tuning capacitor in an impedance matching network connected between the cathode electrode and an RF power supply. A fault caused by excessive residue accumulation on the chuck typically would be correlated with both of these process variables. However, a fault caused by particles on an underside of the work piece could typically be correlated only with the helium flow rate. Therefore, a first fault signature associated with a first fault class defined as a faulty electrostatic chuck would be divided into a second fault signature associated with a second fault class defined as a faulty electrostatic chuck caused by particles on an underside of the work piece. The first fault class could then be redefined as a faulty electrostatic chuck caused by residue accumulation on the chuck.

TABLE 7

Original Fault Signature With Ranking Range

| Process Variable | Ranking Range |
| --- | --- |
| A | 1-2 |
| B | 1-2 |
| C | 3 |
| D | 4 |

TABLE 8

New Fault Signature Based On Fault Signature Division

| Process Variable | Ranking Range |
| --- | --- |
| A | 1 |
| B | 2 |
| C | 3 |
| D | 4 |

TABLE 9

Updated Fault Signature Based On Fault Signature Division

| Process Variable | Ranking Range |
|---|---|
| A | 2 |
| B | 1 |
| C | 3 |
| D | 4 |

Table 7 illustrates a fault signature having a ranking range. Tables 8 and 9 illustrate two new fault signatures produced by dividing the fault signature of Table 7, in accordance with method 500 of FIG. 5. In the original fault signature of Table 7, process variables A and B are assigned a ranking range of 1-2, and the original fault signature is associated with a fault class identified as X. The new fault signature of Table 8 is associated with a new fault class Y, and has a contribution rank of 1 and 2, respectively, for process variables A and B. The updated fault signature of Table 9 is associated with an updated fault class X, and has a contribution rank of 2 and 1, respectively, for process variables A and B.

Figure 6:
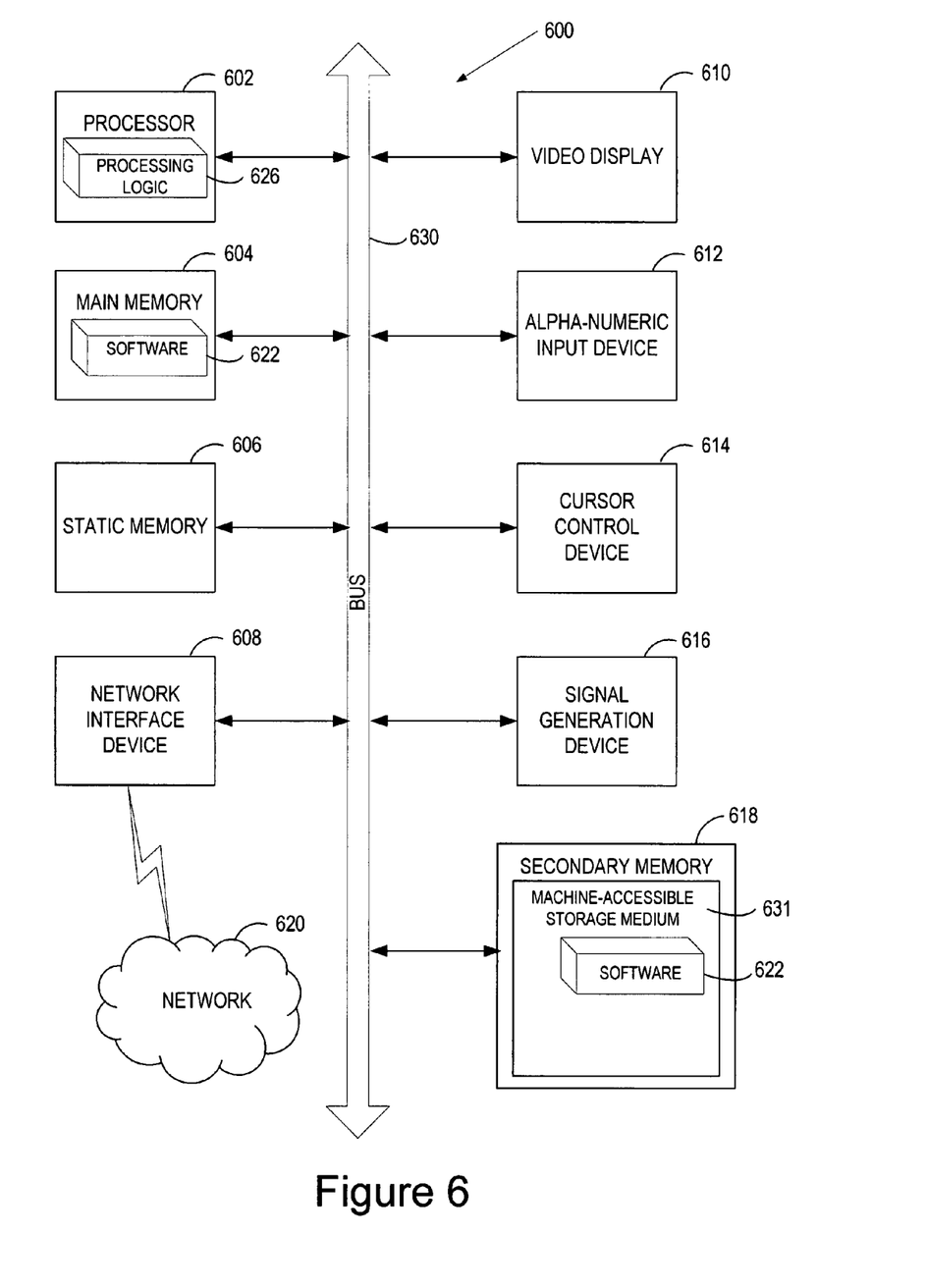
FIG. 6 illustrates a diagrammatic representation of a machine in the exemplary form of a computer system within which a set of instructions, for causing the machine to perform any one or more of the methodologies discussed herein, may be executed.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-accessible storage media. The software 622 may further be transmitted or received over a network 620 via the network interface device 608.

The machine-accessible storage medium 631 may also be used to store data structure sets that define user identifying states and user preferences that define user profiles. Data structure sets and user profiles may also be stored in other sections of computer system 600, such as static memory 606.

While the machine-accessible storage medium 631 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of diagnosing faults, comprising:
    detecting a current fault by a statistical process monitoring apparatus;
    determining one or more process variables that contributed to the current fault;
    calculating a relative contribution set based on a relative contribution to the current fault of each of the one or more process variables;
    comparing the calculated relative contribution set to stored relative contribution sets, wherein each of the stored relative contribution sets defines a fault signature, each stored relative contribution set including stored relative contributions of process variables having greatest statistical contributions to a specific fault;
    determining a fault signature that matches the fault, the stored relative contribution set of the determined fault signature including relative contribution ranges, wherein the relative contribution ranges are based on overlapping relative confidence ranges of at least two process variables, the fault signature matching the fault if the relative contributions in the calculated relative contribution set are within the relative contribution ranges; and identifying a fault class that defines a cause of the current fault.

2. The method of claim 1, further comprising:

if none of the plurality of fault signatures match the fault, adding a new fault signature for the fault.

3. The method of claim 2, further comprising:

adding a new fault class; and associating the new fault signature with the new fault class.

4. The method of claim 2, wherein the new fault signature is added after a single occurrence of the fault.

5. The method of claim 1, further comprising:

dividing a first fault signature that includes a first relative contribution range for a first process variable into multiple fault signatures, each of the multiple fault signatures having a different relative contribution of the first process variable, and each of the multiple fault signatures associated with a different fault class.

6. The method of claim 1, wherein multiple fault classes are associated with a single fault signature.

7. The method of claim 1, further comprising:

tallying a number of times each associated fault class is confirmed as an actual fault for a particular fault signature.

8. The method of claim 1, further comprising:

determining which of the plurality of fault signatures partially matches the fault, a partial match occurring if the relative contributions of at least one of the one or more process variables are not within the relative contribution range of a fault signature; and assigning a match closeness score to one or more of the plurality of fault signatures.

9. The method of claim 1, wherein at least one of the plurality of fault signatures is a combined fault signature having a first fault signature based on a first statistical model and a second fault signature based on a second statistical model.

10. A computer readable storage medium including instructions that, when executed by a machine, cause the machine to perform a method comprising:

detecting a current fault by a statistical process monitoring apparatus;

determining one or more process variables that contributed to the current fault;

calculating a relative contribution set based on a relative contribution to the current fault of each of the one or more process variables;

comparing the calculated relative contribution set to stored relative contribution sets, wherein each of the stored relative contribution sets defines a fault signature, each stored relative contribution set including stored relative contributions of process variables having greatest statistical contributions to a specific fault;

determining a fault signature that matches the fault, the stored relative contribution set of the determined fault signature including relative contribution ranges, wherein the relative contribution ranges are based on overlapping relative confidence ranges of at least two process variables, the fault signature matching the fault if the relative contributions in the calculated relative contribution set are within the relative contribution ranges; and identifying a fault class that defines a cause of the current fault.

11. The computer readable storage medium of claim 10, the method further comprising:

if none of the plurality of fault signatures match the fault, adding a new fault signature for the fault.

12. The computer readable storage medium of claim 11, the method further comprising:

adding a new fault class; and associating the new fault signature with the new fault class.

13. The computer readable storage medium of claim 10, the method further comprising:

dividing a first fault signature that includes a first relative contribution range for a first process variable into multiple fault signatures, each of the multiple fault signatures having a different relative contribution of the first process variable, and each of the multiple fault signatures associated with a different fault class.

14. The computer readable storage medium of claim 10, the method further comprising:

tallying a number of times each associated fault class is confirmed as an actual fault for a particular fault signature.

15. The computer readable storage medium of claim 10, the method further comprising:

determining which of the plurality of fault signatures partially matches the fault, a partial match occurring if the relative contributions of at least one of the one or more process variables are not within the relative contribution range of a fault signature; and assigning a match closeness score to one or more of the plurality of fault signatures.

16. The computer readable storage medium of claim 10, wherein at least one of the plurality of fault signatures is a combined fault signature having a first fault signature based on a first statistical model and a second fault signature based on a second statistical model.

17. A statistical process monitoring system, comprising:

a fault detector coupled with at least one manufacturing machine to receive process data from the at least one manufacturing machine, and to detect a fault based on the process data, the process data including a plurality of process variables;

a database to store a plurality of fault signatures, each of the fault signatures being associated with at least one fault class; and a fault diagnoser coupled with the fault detector and coupled with the database to determine one or more of the plurality of process variables that contributed to the fault, to calculate a relative contribution set based on a relative contribution to the current fault of each of the one or more process variables, to compare the calculated relative contribution set to stored relative contribution sets, wherein each of the stored relative contribution sets defines a fault signature, each stored relative contribution set including stored relative contributions of process variables having greatest statistical contributions to a specific fault, to determine a fault signature that matches the fault, the stored relative contribution set of the determined fault signature including relative contribution ranges, wherein the relative contribution ranges are based on overlapping relative confidence ranges of at least two process variables, the fault signature matching the fault if the relative contributions in the calculated relative contribution set are within the relative contribution ranges, and to identify a fault class that defines a cause of the current fault.

18. The statistical process monitoring system of claim 17, wherein the fault diagnoser to store a new fault signature in the database if none of the plurality of fault signatures matches the fault.

19. The statistical process monitoring system of claim 18, wherein the fault diagnoser to store a new fault class in the database, and to associate the new fault signature with the new fault class.

20. The statistical process monitoring system of claim 17, wherein the fault diagnoser further to determine which of the plurality of fault signatures partially matches the fault, a partial match occurring if the relative contributions of at least one of the one or more process variables are not within the relative contribution range of a fault signature, and to assign a match closeness score to one or more of the plurality of fault signatures.

21. The statistical process monitoring system of claim 17, wherein at least one of the plurality of fault signatures is a combined fault signature having a first fault signature based on a first statistical model and a second fault signature based on a second statistical model.

* * * * *